G. C. CLAYPOOLE.
VOTING MACHINE.
APPLICATION FILED APR. 10, 1912.

1,058,723.

Patented Apr. 15, 1913.

7 SHEETS—SHEET 1.

Witnesses:
N. C. Lombard
Edward H. Allen

Inventor:
Guy C. Claypoole
by Walter E. Lombard,
Atty.

G. C. CLAYPOOLE.
VOTING MACHINE.
APPLICATION FILED APR. 10, 1912.
1,058,723.
Patented Apr. 15, 1913.
7 SHEETS—SHEET 2.
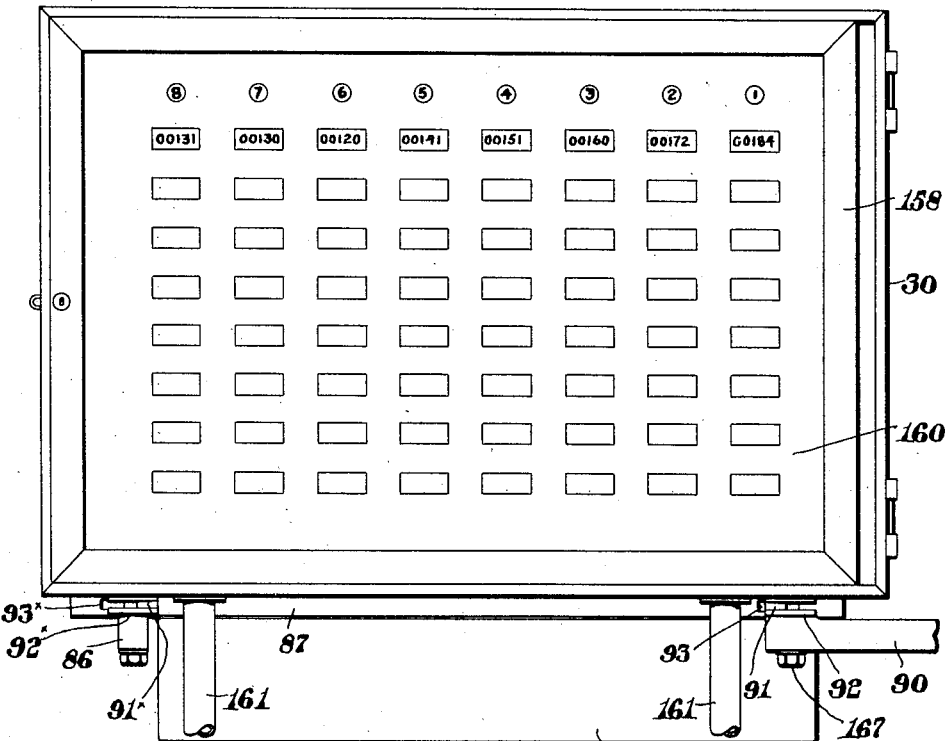
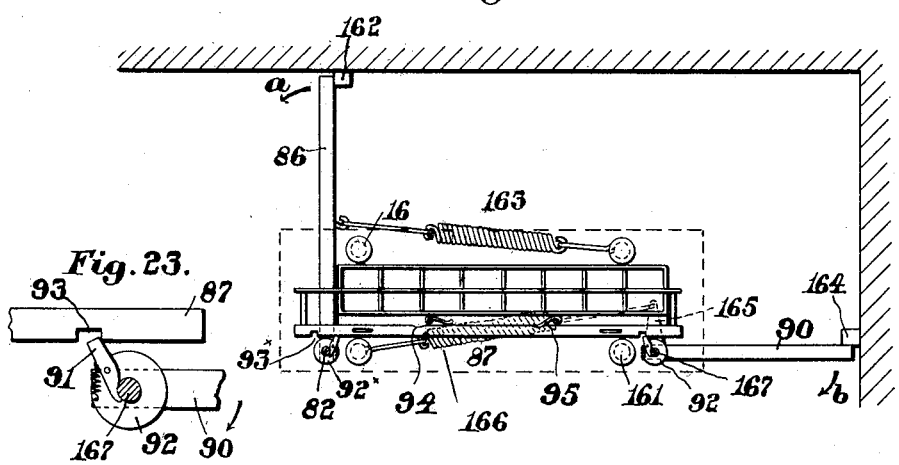
Witnesses:
N. C. Lombard
Edward H. Allen
Inventor:
Guy C. Claypoole,
by Walter E. Lombard,
Atty.

G. C. CLAYPOOLE.
VOTING MACHINE.
APPLICATION FILED APR. 10, 1912.
1,058,723.
Patented Apr. 15, 1913.
7 SHEETS—SHEET 3.
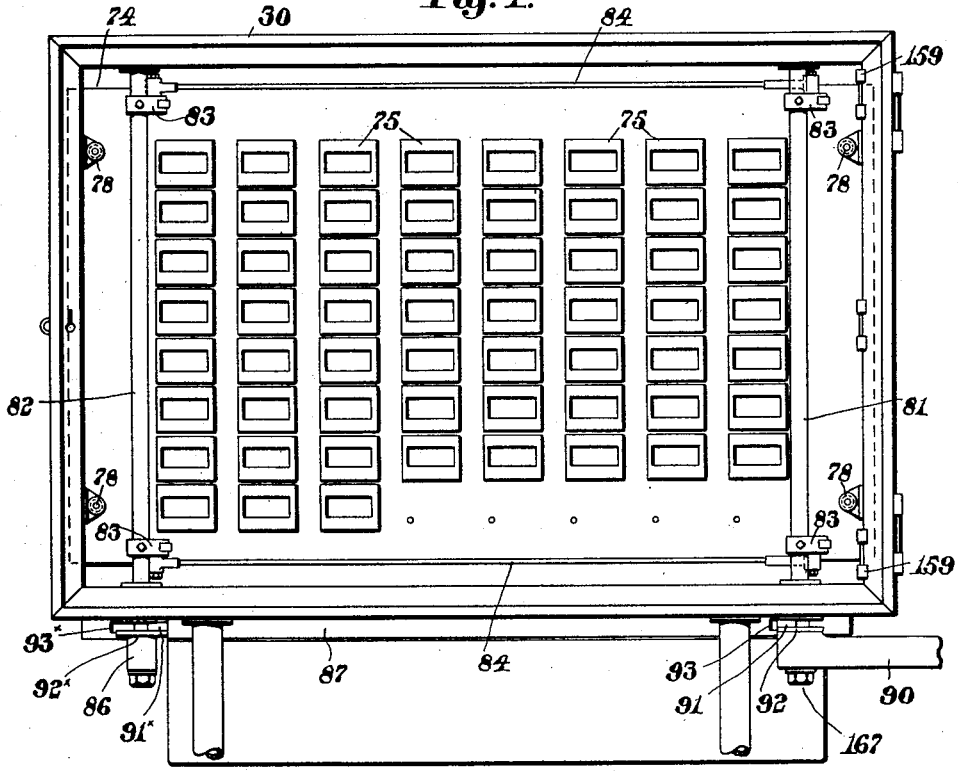
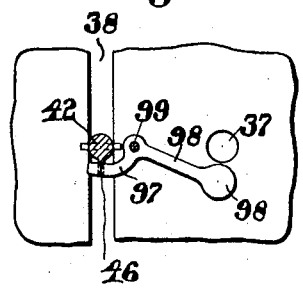
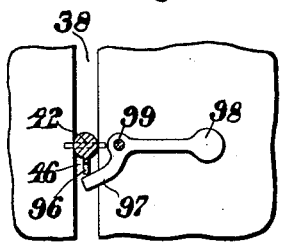
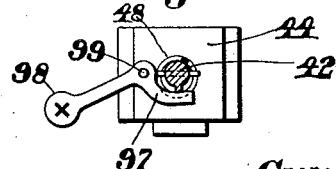
Witnesses:
N. C. Lombard
Edward F. Allen
Inventor:
Guy C. Claypoole,
by Walter E. Lombard,
Atty.

G. C. CLAYPOOLE.
VOTING MACHINE.
APPLICATION FILED APR. 10, 1912.

1,058,723.

Patented Apr. 15, 1913.

7 SHEETS—SHEET 4.

Witnesses:
N. C. Lombard
Edward H. Allen

Inventor:
Guy C. Claypoole,
by Walter E. Lombard,
Atty.

COLUMBIA PLANOGRAPH CO., WASHINGTON, D. C.

G. C. CLAYPOOLE.
VOTING MACHINE.
APPLICATION FILED APR. 10, 1912.

1,058,723.

Patented Apr. 15, 1913.

7 SHEETS—SHEET 5.

Witnesses:
N. C. Lombard
Edward F. Allen

Inventor:
Guy C. Claypoole,
by Walter E. Lombard,
Atty.

G. C. CLAYPOOLE.
VOTING MACHINE.
APPLICATION FILED APR. 10, 1912.
1,058,723.
Patented Apr. 15, 1913.
7 SHEETS—SHEET 6.
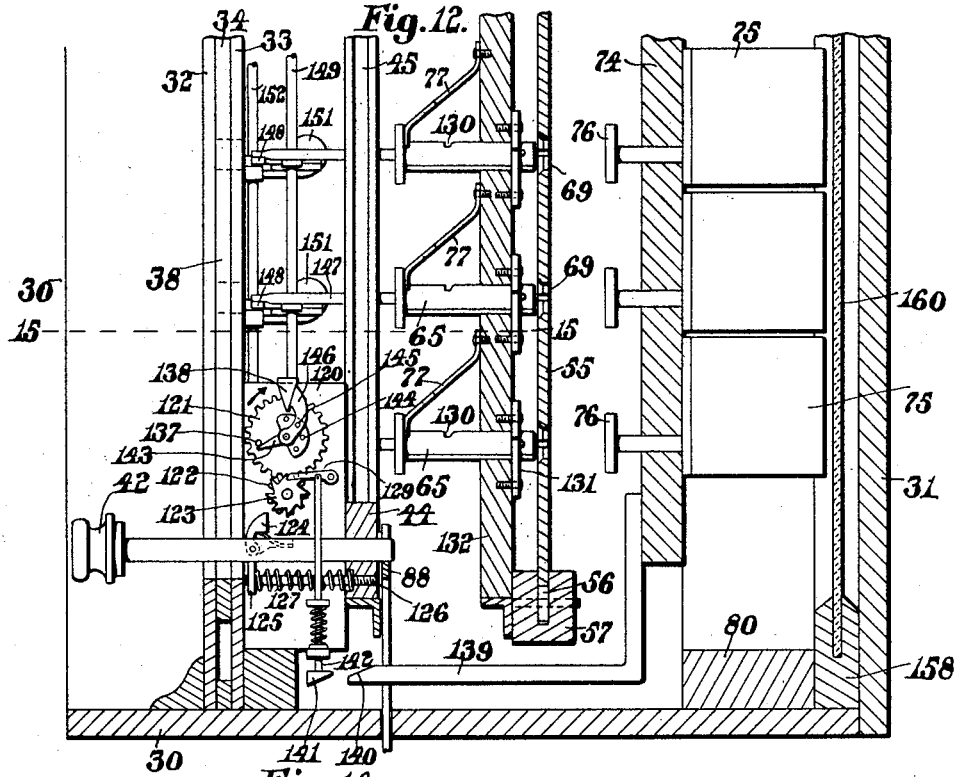
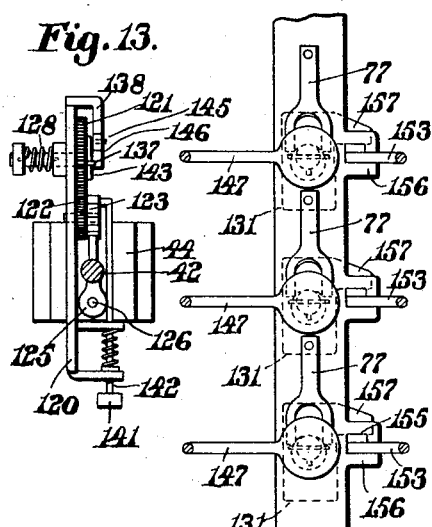
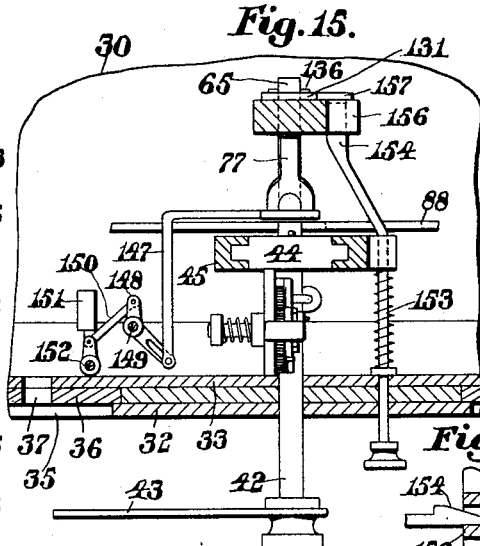
Witnesses:
N. C. Lombard
Edward H. Allen
Inventor:
Guy C. Claypoole,
by Walter E. Lombard,
Atty.

G. C. CLAYPOOLE.
VOTING MACHINE.
APPLICATION FILED APR. 10, 1912.
1,058,723.
Patented Apr. 15, 1913.
7 SHEETS—SHEET 7.
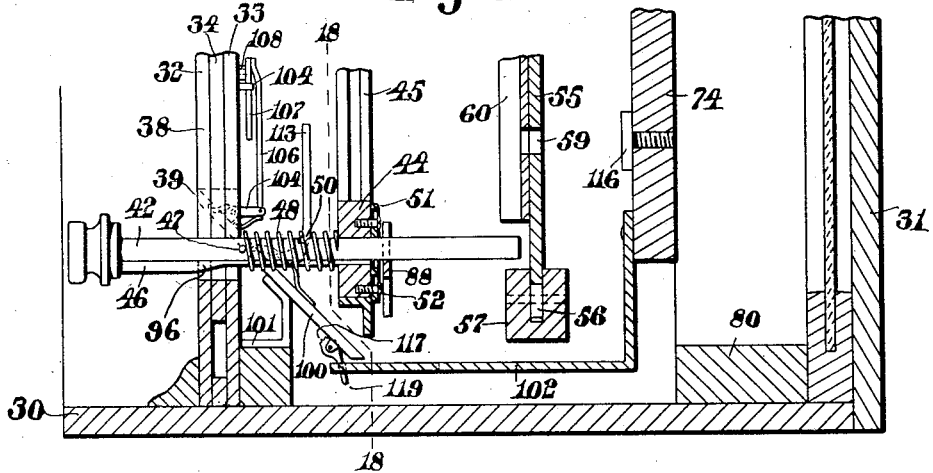
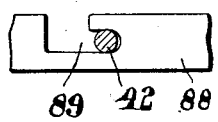
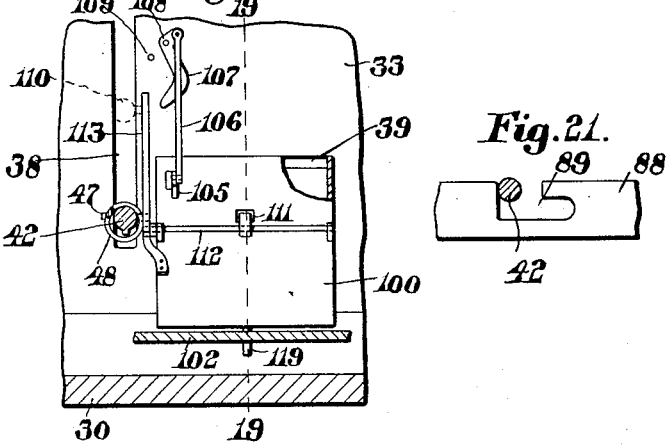
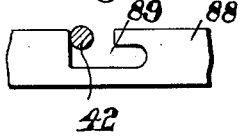
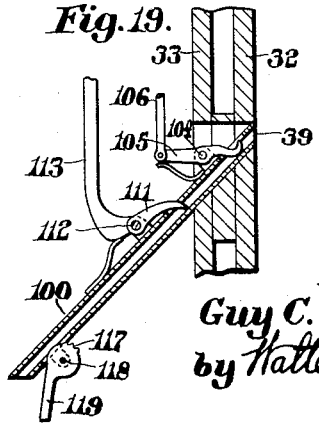
Witnesses:
N. C. Lombard
Edward F. Allen
Inventor:
Guy C. Claypoole,
by Walter E. Lombard
Atty.

UNITED STATES PATENT OFFICE.

GUY C. CLAYPOOLE, OF WEST SOMERVILLE, MASSACHUSETTS, ASSIGNOR OF ONE-FOURTH TO ALBERT J. LEAVITT, OF BOSTON, MASSACHUSETTS.

VOTING-MACHINE.

1,058,723. Specification of Letters Patent. Patented Apr. 15, 1913.

Application filed April 10, 1912. Serial No. 689,921.

*To all whom it may concern:*

Be it known that I, GUY C. CLAYPOOLE, a citizen of the United States of America, and a resident of West Somerville, Middlesex county, and State of Massachusetts, have invented certain new and useful Improvements in Voting-Machines, of which the following is a specification.

This invention relates to voting machines, and has for its object the production of a machine of this class which will be effective in operation and simple in construction.

The invention consists in certain novel features of construction and arrangement of parts which will be readily understood by reference to the description of the drawings and to the claims hereinafter given.

Figure 1:
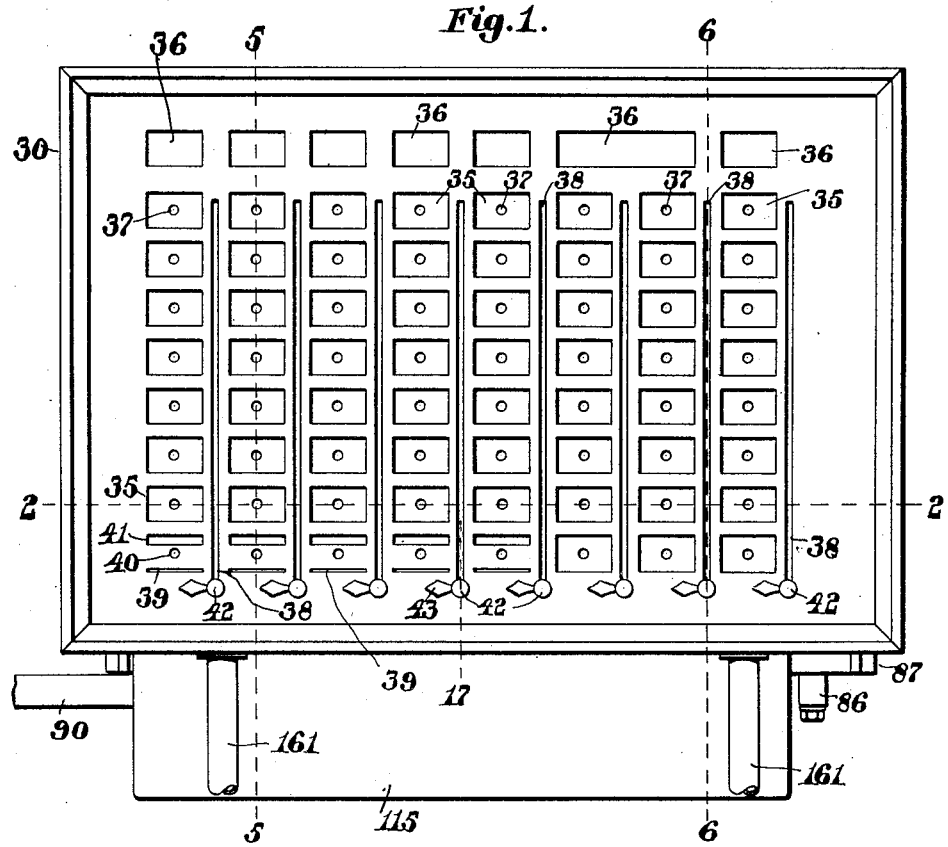
Figure 2:
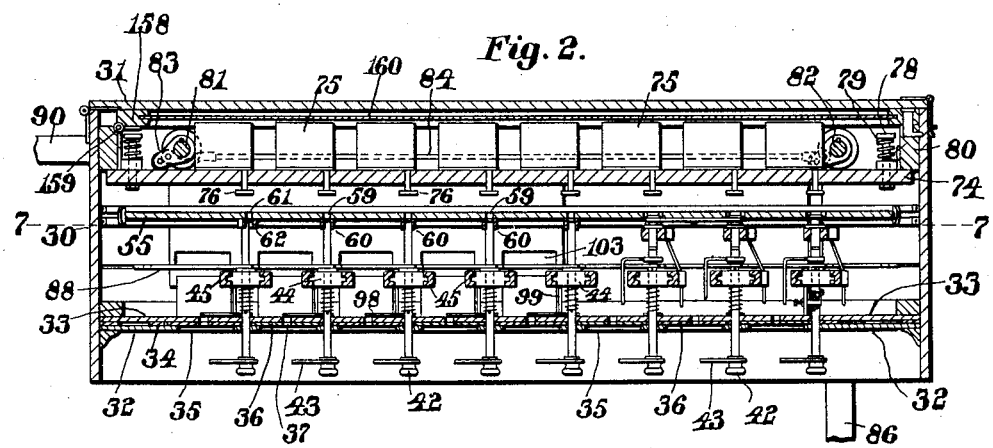
Figure 5:
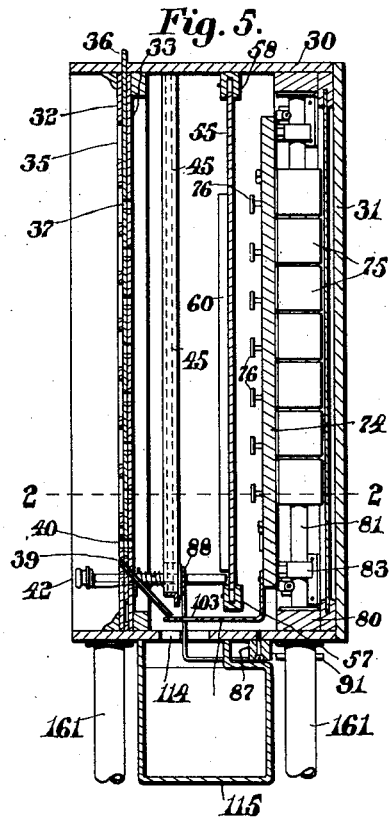
Figure 6:
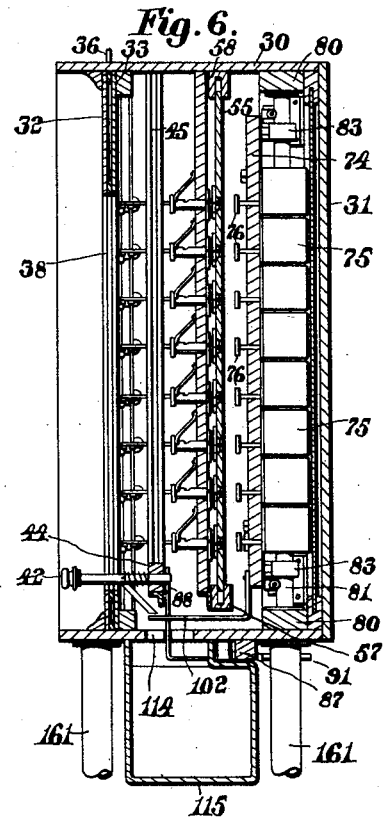
Figure 9:
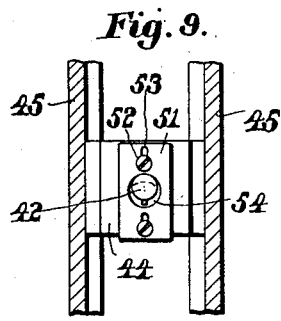
Figure 10:
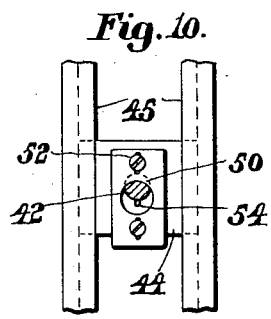
Figure 11:
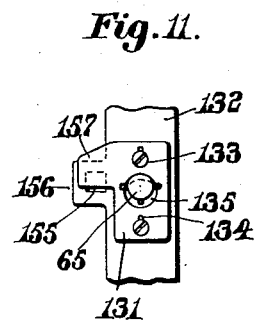
Figure 7:
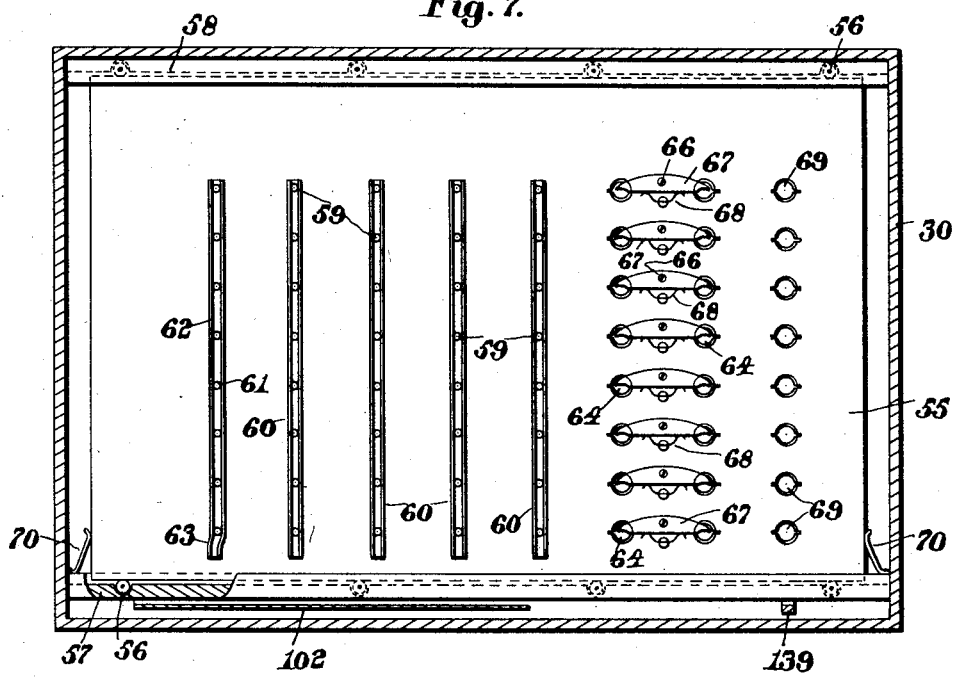
Figure 8:
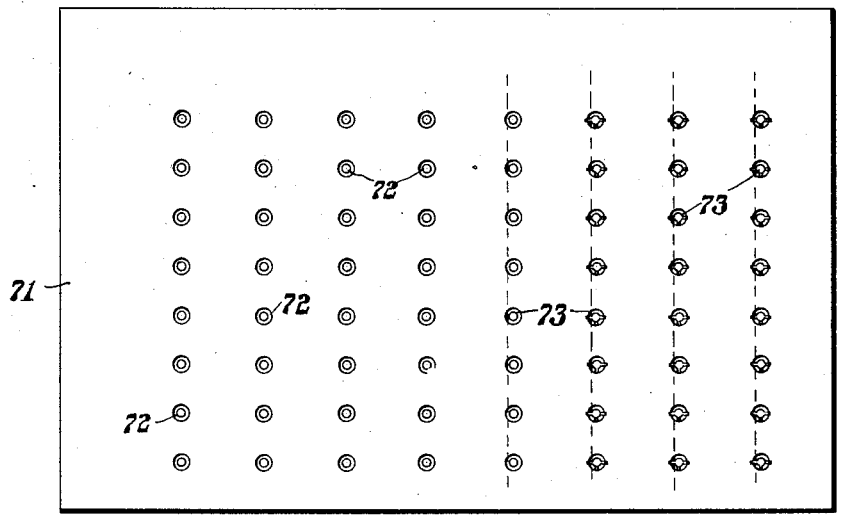

Of the drawings: Figure 1 represents a front elevation of a machine embodying the principles of the present invention. Fig. 2 represents a horizontal section of the same, the cutting plane being on line 2—2 of Fig. 1. Fig. 3 represents a rear elevation of the same with the outer door thereof removed. Fig. 4 represents a similar elevation of the same with the inner door removed. Fig. 5 represents a vertical transverse section of the same, the cutting plane being on line 5—5 on Fig. 1. Fig. 6 represents a vertical transverse section of the same, the cutting plane being on line 6—6 on Fig. 1. Fig. 7 represents a vertical section of the same, the cutting plane being on line 7—7 on Fig. 2, and showing the movable perforated plate. Fig. 8 represents an elevation of a movable plate adapted for use in primary elections. Figs. 9 and 10 represent elevations of the locking device for the spring pressed voting pin. Fig. 11 represents a locking device for the operating member used in referendum or group voting. Fig. 12 represents an enlarged vertical transverse section of the lower part of said voting machine, and showing therein the group voting devices. Fig. 13 represents an elevation of a vertical movable block having secured thereto a group vote controlling mechanism. Fig. 14 represents an elevation of a vertical support and a plurality of operating plungers thereon to be used in connection with group voting. Fig. 15 represents a horizontal section of a portion of the machine, the cutting plane being on line 15—15 on Fig. 12, and showing the group voting mechanism. Fig. 16 represents a detail of construction to be hereinafter referred to. Fig. 17 represents a vertical section of a portion of the machine, the cutting plane being on line 17 on Fig. 1, and showing mechanism for casting independent ballots. Fig. 18 represents a section of the same, the cutting plane being on line 18—18 on Fig. 17. Fig. 19 represents a vertical section of the same, the cutting plane being on line 19—19 on Fig. 18. Figs. 20 and 21 represent elevations of a portion of the voting pin locking bar with the voting pin in different positions therein. Fig. 22 represents a horizontal section of a booth and showing the inlet and exit gates for said booth and the mechanisms forming part of the voting machine controlled thereby. Fig. 23 represents a detail of construction to be hereinafter referred to. Figs. 24, 25, and 26 represent details showing the indicator member in various positions.

Similar characters designate like parts throughout the several figures of the drawings.

In the drawings, 30 represents a casing having hinged to the rear side thereof a door 31. The front side of said casing when the machine is not in use is closed by any suitable plate which is not shown. Within the casing 30 are two plates 32 and 33 slightly separated by means of strips 34. The plate 32 between the strips 34 is provided with a plurality of openings or name plates 35 in the vertical rows as clearly indicated in Fig. 1 of the drawings. In the rear of said openings 35 are inserted between the plates 32 and 33 name strips 36, each of which is provided in the center of each name plate 35 with a perforation 37. At the right of each row of name plates 35 is a vertical slot 38 extending through the plates 32 and 33 and the separating strips 34. The first vertical row represents name plates for party voting. The next four rows of name plates are for offices to which but one person may be elected, while the right column of name plates, as shown in the drawings, is for positions to which two or more persons are to be voted for, and the other two columns, as shown in Fig. 1 of the drawings, are for referendum voting. Beneath each of the single vote columns of name plates is a slot 39 in which may be inserted an independent ballot and above each slot 39 is a vote indicator perforation 40 and a name plate 41. In the bottom of each slot 38 is a voting pin 42 provided with an index 43 adapted to register with an indicator opening 37 or 40 when said pin is raised in the slot 38. This pin 42 extends through a block 44 slidable between the vertical guides 45 in the rear of the plate 33. The pin 42 is provided with a fin 46 extending through a slot in the block 44 to prevent said pin from rotating. Each pin 42 is provided with a projection 47 between which and the block 44 is a spring 48 normally retaining said voting pin in the position indicated in Figs. 2, 5, 6, and 17. The pin is limited in its outward movement by the projection 47 contacting with the rear face of the plate 33. Each pin 42 is provided in its upper portion with a locking notch 50 adapted to be engaged by a locking plate 51 shown in detail in Figs. 9 and 10 of the drawings. This plate is secured in the rear face of the slidable block 44 by means of screws 52 extending through slots 53 therein. The locking member 51 is provided with an opening 54 therethrough of greater diameter than the voting pin 42 and the upper wall of said opening 54 normally rests upon the upper surface of the pin 42. When, however, the voting pin 42 is pressed inwardly against the tension of the spring 48 so that the notch 50 is in the same plane with the plate 51, said plate will drop by gravity into said notch 50 and retain said voting pin in this position. The inner wall, however, of the notch 50 is somewhat inclined so that while it will resist some degree of pressure, the voter, if he so desires, may withdraw the voting pin again to move it into a new position and vote for another person if he has in the meantime changed his mind. To the rear of the vertical guides 45 is a perforated plate 55 adapted to be moved endwise upon the rollers 56 in grooved members 57 and 58. This plate 55 is provided with a plurality of perforations 59 in vertical rows, each of these perforations being in the same horizontal plane with an indicator opening 37 or 40. These rows of perforations 59 are the same distance apart as the slots 38, and on either side of each row is a projecting flange 60 secured to the plate 55. The movable plate 55 also has extending therethrough another row of perforations 61, a less distance apart from the other row of perforations 59 than the distance between the slots 38. This row of perforations 61 has on either side thereof a flange 62 which is slightly curved at the bottom as indicated at 63 in Fig. 7 of the drawings, so that the center of the slot formed thereby at the extreme lower end is equidistant with the slots 38. These flanges 60 and 62 do not extend to the bottom of the plate 55, but end slightly above the normal lower position of the pin 42 when it is resting in the bottom of its slot 38. The object of the cam portion 63 of the flanges 62 is to prevent one of the pins 42 from entering between the flanges 59 when the voting pin 42 has been moved upwardly in its slot 38 between the flanges 62.

It is obvious, from an inspection of the drawings, that should the left hand voting pin be raised into its slot 38 into position to permit it to be inserted in the lower perforation 61, the movement of the end of the pin 42 acting upon the cam portion 63 will move the plate 55 to the left of Fig. 7 sufficiently far so that the perforations 59 will be out of register with the other voting pins. The voter is thereby prevented, when he has decided to vote a straight ticket, from voting for any of the other officers, and the reverse is also true, that is, when one of the other voting pins 42 has been moved up in its slot 38 between the flanges 60 the left hand voting pin cannot be raised a sufficient distance to register with the perforation 61. The plate 55 is also provided with two vertical rows of perforations 64 having beveled edges, these perforations being considerably larger than the perforations 59 and 61, so that the operating pin 65 may be moved into the perforation 64 whether the plate is in position to receive straight party votes or votes for individual offices. Pivoted at various points on the plate 55 by pins 66 are the members 67 each normally retained in the position indicated in Fig. 7 of the drawings by a balanced spring 68. The ends of each member 67 partially cover a pair of perforations 64 and are slightly beveled off so that when the operating member 65 is forced against the beveled end thereof said member 67 will be moved about the pivot 66 against the tension of the spring 68 so that its opposite end will be interposed between the end of a companion operating member 65 thereby preventing said companion member from being inserted through the perforation with which it registers. This device prevents the voter from voting twice on the same referendum question. The movable plate is also provided with another row of perforations 69, which perforations are also larger than the perforations 59 and 61, so that an operating member 65 may be inserted therethrough, whether the movable plate is in position to be used for straight party voting or individual office voting. The ends of the movable plate are engaged by springs 70 which retain said plate in its normal central position. When it is desired to use the machine for primary voting this plate may be removed therefrom and a plate similar to that shown in Fig. 8 of the drawings may be inserted in lieu thereof. This plate 71 is provided with four vertical rows of perforations 72 having beveled edges, these rows being equidistant apart and at the same distance apart as the slots 38. The plate is also provided with four more vertical rows of perforations 73, these rows being equidistant apart and the entire group is separated from the first group by a greater distance than the distance between the slots 38. One group represents, for instance, the Republican candidates, and the other group represents the Democratic candidates, so that if a voter votes for a Republican for any office the plate 71 will be moved into position so that the balance of his voting must be for other Republican candidates, and makes it impossible for him to vote for a Democrat for any office.

To the rear of the movable plate 55 is a movable member 74 having secured to the rear face thereof a plurality of registering devices 75 each having an actuating plunger 76 extending through said movable member 74 in alinement with each perforation 59, 61, 64, and 69. When any of the voting pins or other operating members have been moved through any of these perforations 59, 61, 64, and 69, and locked in position and the movable member 74 is moved toward the front of the machine, the operating members being locked will cause the plungers 76 to be actuated until the heads thereof come in contact with the front face of the movable member 74, this movement causing the registers 75 to be operated wherever a plunger has contacted with an operating member 42 or 65, and then the continued movement of the movable member 74 will cause all of these pins 42 or operating members 65 to be unlocked and returned to their normal positions by means of the springs 48 and 77 controlling the movement of said pins and operating members. This movable member 74 is provided with a plurality of headed members 78 secured thereto which members are surrounded by springs 79 which normally retain the movable member 74 at the rear of the machine against the stops 80. To the rear of this movable member are oscillating shafts 81 and 82, having keyed thereto the arms 83 having rollers in the ends thereof bearing against the rear face of the movable member 74. These arms 83 are connected together by means of a rod 84. Secured to the lower end of the oscillating shaft 82 is an exit gate 86 adapted to be moved in the direction of the arrow $a$ on Fig. 22 of the drawing.

When the voter has completed the operation of voting and passes out from the booth, he moves the gate 86 in the direction indicated by the arrow $a$ on said Fig. 22, and in so doing oscillates the shafts 81 and 82 so that the arms 83 keyed thereto will move the member 74 toward the front of the machine, and thereby register all of the votes which have been cast by said voter and release all of the voting pins and operating members actuated by said voter so that the machine will be in readiness for another voter as soon as he has entered the voting booth. As soon as the voting pins 42 have been released they will drop by gravity in the slots 38 into their normal position, as indicated in Fig. 1 of the drawings, and during the movement of the gate 86 about the axis of the shaft 82 a movable bar 87 beneath the casing 30 will be moved so that a plate 88 secured thereto and provided with a plurality of bayonet slots 89 will be moved into such position that the voting pins 42 will be locked and cannot be again raised in the slots 38 until the next voter in entering the booth moves the inlet gate 90 in the direction of the arrow $b$ on Fig. 22 of the drawings. By moving this gate in this direction the pawl member 91, pivotally secured to the disk 92, will engage the notch 93 in the bar 87 and move the bar to the right of Fig. 2 of the drawings, thus moving the plate 88 to the right of Fig. 20 of the drawings a sufficient distance to permit the pin 42 to be released from the bayonet slot and to be raised in the slot 38. The bar 87 is provided with notches 94 each of which is adapted to be engaged by a spring 95 to prevent the accidental movement of said bar. Each fin 46 on a voting pin 42 is provided with a cam face 96, which, when said pin is forced inwardly through a perforation in the movable plate 55, engages an arm 97 of an indicator 98 pivoted at 99, thereby moving said indicator into alinement with a perforation 37 or 40, thereby informing the voter that the operating member is in proper position to register the vote he desires to cast.

Each slot 39 in the plate 32 communicates with a chute 100 inclined downwardly into the interior of the casing 30, said chute being supported by a suitable bracket 101. The lower delivery end of the chute 100 is normally closed by the plate 102 secured to the movable member 74. This plate 102 is provided with a plurality of slots 103 therein, one of which is adapted to register with the delivery end of each chute 100 when the movable member 74 has reached its extreme inward position. Pivoted at 104 to the upper wall of the chute 100 is a spring pressed lever 105 having a curved finger extending downwardly into the interior of said chute. This lever is connected by means of a link 106 (Fig. 18) with a curved member 107 pivoted at 108 to the plate 33 at one side of each of the slots 38 in the candidate voting column or in the columns for individual voting. Should a voter desire to vote for an independent candidate for any office whose name was not printed upon the strip 36, he is entitled to secure from the attendant a card adapted for insertion within the chute 100 upon which he may write the name of the party he desires to vote for. As soon as he inserts this card into the mouth of the chute 100 this card will act upon the curved end of the lever 105 and move it about its pivot by such insertion, and in so doing moves the curved member 107 about its pivot into contact with the stop pin 109. When the curved member 107 has been moved into this position, the toe thereof will be immediately above the position it is necessary that the pin 42 should assume in order to vote for an independent candidate, this position being indicated in dotted lines in Fig. 18 of the drawings at 110. This positioning of the member 107 as described prevents the voting pin 42 being again raised in the slot 38 to vote for any other party for the same office.

The card ballot for an independent candidate can only be inserted a short distance in the chute 100, its further insertion being prevented by the stop finger 111 extending through the upper wall of the chute 100 and secured to the oscillating shaft 112. The outer end of this shaft 112 has secured thereto a spring pressed arm 113 extending upwardly in the path of the stop pin 47. When the voting pin 42 has been raised in the position indicated at 110 in dotted lines on Fig. 18 of the drawings and has been forced inwardly against the tension of the spring 48, the stop member 47 will engage the spring pressed arm 113 and move it about its pivot 112 so that the toe 111 is removed from the chute and the card ballot is permitted to pass through the chute with its inner end resting upon the plate 102. The pin 42 when forced inwardly in this manner is locked by the locking plate 51 engaging with the notch 50 in said pin. The various elements remain in this position until the voter has completed his work and passes from the booth, opening the gate 86 in so doing, and thereby causing the inward movement of the movable member 74 as heretofore described. This inward movement of the member 74 brings the slots 103 opposite the delivery end of the chute 100 so that the card ballot is free to pass through the slot and through an opening 114 into a partitioned receptacle 115 secured to the bottom of the casing 30. The member 74 has secured thereto the headed member 116, which, in the movement of said member 74, engages the extreme inner end of the voting pin 42 which has previously been inserted through the perforation 59 and thereby releases it from engagement with the locking plate 51 and permits it to return to its normal position, the spring 48 acting upon the stop member 47 to effect this return movement. In order to assist the movement of the card ballot through the chute 100 a serrated member 117 is pivoted at 118 to ears projecting downwardly from the under side of said chute. This member 117 is provided with an arm 119 extending through an opening in the plate 102 so that as the plate 102 moves inwardly with the member 74 the serrated member 117 will be moved about its pivot so that the serrations in the edge thereof will impinge upon the card ballot and start it on its downward movement into the receptacle 115. This provides a very effective means for permitting the voter to cast a ballot for any person on the printed slip or for an independent candidate for the same office, and effectually prevents him from making any mistake by voting for two persons for a single office. In some cases, however, it is necessary to provide a means whereby votes may be cast for two or more persons for the same position, and this is accomplished by a group voting mechanism. In this connection the sliding block 44 has secured thereto a plate 120 in which is revolubly mounted a gear 121 meshing with a pinion 122.

The pinion shaft has secured thereto the ratchet member 123 adapted to be engaged by the spring pressed pawl 124 pivotally mounted in the voting pin 42. When the pin 42 is forced inwardly the pawl 124 engages a tooth of the ratchet 123 and moves it about its axis, thereby causing a rotation of the pinion 122 and the movement of the gear 121 in the direction of the arrow on Fig. 12 of the drawings. The pin 42 is provided with an arm 125 having an opening therein through which extends a rod 126 secured to the block 44 and surrounded by a spring 127 adapted to retain said pin 42 in its normal outward position as indicated in Fig. 12 of the drawings. The shaft of the gear 121 is surrounded by a spring 128 which tends to move said gear in a direction opposite the arrow on said figure. This backward movement, however, is prevented by means of the pawl 129 engaging the teeth of the ratchet 123. In operating this group voting device, the pin 42 with its block 44 is lifted so that it will register with one of the plungers 65, and when forced inwardly it will force a plunger 65 through one of the perforations 69 in the movable plate 55 until the notch 130 in said plunger or operating member is engaged by the locking plate 131 secured to a vertical bar 132 in front of the movable plate 55 by means of screws 133 extending through slots 134 therein as shown in Fig. 11 of the drawings. This plate is provided with an opening 135 therein of greater diameter than the operating member 65 extending therethrough, and normally the plate rests upon the upper surface of the pin until the notch 130 is moved into the same plane with the plate 131, whereupon the plate drops into the notch 130 and locks the operating member 65 in this inward position. These operating members 65 will remain in this locked position until the member 74 has been moved inwardly by the exit of the voter.

When the actuating plungers 76 of the registering devices 75 will act thereon to unlock them and permit the spring 77 to return them to their normal position, their return movement being limited by means of the pins 136 thereon coming in contact with the inner face of the plate 131. When the group voting device has been moved up into alinement with the plungers 65 and has been operated to cast one vote the pin 137 will move in the direction of the arrow on Fig. 12 of the drawings and the stop pawl 129 will engage with the teeth of the ratchet 123 to prevent its return. The pin 42 may then be lifted again into a position to register with another plunger 65 and when this has been forced inwardly by the operating pin 42 the pin 137 will have moved into contact with the stop member 138 and further voting in this column will be prevented. When the registering is done by the inward movement of the member 74 an arm 139 secured thereto and having a beveled end 140 engages the beveled head 141 on a spring pressed rod 142 thereby disengaging the pawl 129 from the teeth of the ratchet 123 and permits the spring 128 to rotate the gear 121 until the pin 137 therein again engages the finger 143 loosely mounted upon the shaft of the said gear 121. This finger 143 is provided with a plurality of holes 144 into which a pin 145 is adapted to be inserted to lock thereto a finger 146 which engages the opposite face of the stop member 138. It is obvious that by locking this finger 146 in different positions relative to the finger 143 a greater or lesser number of votes may be cast by this group voting device. This, however, must be predetermined before the voting commences, and if there are two candidates to be voted for for a particular office the fingers 146 and 143 are adjusted relative to each other accordingly, or if three candidates are to be voted for the fingers 143—146 must be so locked relative to each other that the pin 42 may be forced inwardly three times before the finger 143 comes in contact with the stop member 138. The end of each of the plungers 65 has extending therefrom a bent arm 147 the free end of which is connected to a bell crank lever 148 pivoted at 149, the other arm of which is connected by means of a link 150 to an indicator member 151 pivoted at 152.

It is obvious, by referring to Fig. 15, that every time a plunger 65 is forced inwardly into registering position, the indicator member 151 thereof will be moved about its pivot 152 into a position opposite the opening 37 in the plate 33 and name strip 36 to indicate that the mechanism is in position to register a vote for the person desired. It it possible, however, that after the voter has operated the member 65 so that it has entered the perforations 69 and been locked in this adjusted position by the locking plate 131, he may change his mind and desire to vote for another person, and some provision must be made to return the plunger previously locked to its normal position. This is accomplished by means of the spring pressed rod 153 having a beveled cam face 154 on its inner end, said end passing through a slot 155 in a projection 156 formed upon the vertical member 132. This cam face operates against an extension 157 formed upon the locking plate 131 and said plate is lifted sufficiently to disengage it from the notch 130, thereby permitting the spring 77 to return the plunger 65 to its normal position. Inside of the rear cover 31 is another cover 158 hinged at 159, said cover or door having a glass plate 160 which is painted, leaving spaces thereon unpainted through which the numbers of the registers may be plainly seen. Normally during the voting the outer door 31 is locked and only the attendant can open the same to learn the result of the balloting as indicated by the registers. The attendant has the key to the outer door only, and the inner door is locked and the key held by the city or town clerk, so that at the end of the day the attendant at the voting booth may make his returns from the numbers indicated by the registering devices, but he has no access to the interior of the voting machine, and as a consequence cannot tamper with the interior mechanisms and make a false return. The casing 30 is supported by suitable legs 161.

When the voter has passed from the booth, the gate 86 is returned against the stop 162 by means of a spring 163 interposed between said gate and any suitable fixed point. In a like manner when the voter has entered the booth the gate 90 is returned against the stop 164. This is accomplished by means of an arm 165 movable with said gate 90 and having a spring 166 interposed between its outer end and any suitable fixed point. While the gate 86 is secured to and moves with the vertical shaft 82 the gate 90 is mounted upon a stud 167 in alinement with the shaft 81 but entirely separated therefrom.

It is believed that the operation and many advantages of the invention will be fully understood from the foregoing.

Having thus described my invention, I claim:

1. In a voting machine, the combination with a plurality of registering devices having actuating plungers in alinement; a plate having a vertical slot registering with said actuating plungers; a device normally positioned in the lower end of said slot but freely movable thereon to operate either of said plungers and adapted to be returned to its normal position by its own weight; means for locking said operating device in adjusted position to prevent end movement thereof; and means for moving a registering device in contact with said operating device.

2. In a voting machine, the combination with a plurality of registering devices having actuating plungers in alinement and in a vertical plane; a block normally positioned below the lowest plunger but adapted to be raised into position opposite either plunger and to be returned by its own weight to its normal position; an operating member carried by said block adapted to register with either of said plungers and movable in said block into position to actuate a plunger; means on said block for locking said plunger in adjusted position to prevent end movement thereof; and means for moving a register plunger into contact with an operating member to actuate said register.

3. In a voting machine, the combination with a plurality of registering devices having actuating plungers in alinement; a block movable parallel therewith; an operating member carried by said block adapted to register with either of said plungers and movable in said block to actuate a plunger; a movable plate provided with perforations normally registering with said actuating plungers but adapted to be moved so that said perforations will be out of register therewith; a weighted member carried by said plate and adapted to lock said operating member when moved inwardly and means for moving a register plunger into contact with said operating member when locked and thereby effecting an operation of said register.

4. In a voting machine, the combination with a plurality of registering devices having actuating plungers in alinement; a plate having a slot registering with said actuating plungers; a block movable in guides parallel to said slot; a spring pressed pin carried thereby adapted to operate either one of said actuating plungers; a movable plate provided with alined perforations through either of which the end of said pin is adapted to be inserted; and a flange on each side of said perforations serving as a guide for the end of said pin when said block is moved from its normal position.

5. In a voting machine, the combination with a plurality of registering devices having actuating plungers in alinement; a plate having a slot registering with said actuating plungers; a block movable in guides parallel to said slot; a spring pressed pin carried thereby adapted to operate either one of said actuating plungers; a movable plate provided with alined perforations through either of which the end of said pin is adapted to be inserted; and a flange on each side of said perforations serving as a guide for the end of said pin when said block is moved from its normal position, said flanges being so curved at the lower end that the movement of the pin carrying block along its guides will effect an end movement of said plate by the action of the pin on said curved surface.

6. In a voting machine, the combination with a plurality of registering devices provided with actuating plungers into parallel lines; a movable plate provided with two parallel rows of perforations, said rows being a different distance apart than said lines of plungers; flanges on said plate on each side of said perforations; and an operating member for each line of plungers normally beyond the limits of said flanges but each adapted to be moved between one set of flanges into position to operate one of said plungers and thereby prevent the admission of the other operating member between the other set of flanges.

7. In a voting machine, the combination with a plurality of registering devices provided with actuating plungers in two parallel lines; a movable plate provided with two parallel rows of perforations, said rows being a different distance apart than said lines of plungers; flanges on said plate on each side of said perforations; and an operating member for each line of plungers normally beyond the limits of said flanges but each adapted to be moved between one set of flanges into position to operate one of said plungers and thereby prevent the admission of the other operating member between the other set of flanges, one set of said flanges being straight and the other being so curved at one end that when its operating pin is moved along said flanges a movement of said plate will be effected that will prevent the operation of the other operating member.

8. In a voting machine, the combination of two registering devices each provided with an actuating plunger; a plate provided with perforations registering with said plungers; a spring pressed operating member registering with each perforation and adapted to be inserted through the same to co-act with one of said plungers; and a movable member on said plate adapted to be moved by operation of one of said members to prevent the operation of the other operating member.

9. In a voting machine, the combination of two registering devices each provided with an actuating plunger; a plate provided with perforations registering with said plungers; a spring pressed operating member registering with each perforation and adapted to be inserted through the same to coact with one of said plungers; a movable member on said plate adapted to be moved by operation of one of said members to prevent the operation of the other operating member; and a spring to return said movable member to its normal position.

10. In a voting machine, the combination of two registering devices each provided with an actuating plunger; a plate provided with perforations registering with said plungers; a spring pressed operating member registering with each perforation and adapted to be inserted through the same to co-act with one of said plungers; and a pivoted member on said plate adapted to be moved about its pivot by the operation of one of said members to prevent the operation of the other operating member.

11. In a voting machine, the combination of two registering devices each provided with an actuating plunger; a plate provided with perforations registering with said plungers; a spring pressed operating member registering with each perforation and adapted to be inserted through the same to coact with one of said plungers; a movable member on said plate adapted to be moved by operation of one of said members to prevent the operation of the other operating member; and means on said plate for locking said operating member when inserted in a perforation.

12. In a voting machine, the combination of two rows of registering devices each provided with an actuating plunger; a plate provided with a perforation registering with each plunger; a spring pressed operating member registering with each perforation through which it is adapted to be inserted to coact with an actuating plunger; movable members on said plate each adapted to be moved by an operating member in one row to prevent subsequent movement of a companion operating member in the other row; and a movable spring pressed pin for each row adapted to be moved into position to move either of said operating members in said row into locked position.

13. In a voting machine, the combination of two rows of registering devices each provided with an actuating plunger; a plate provided with a perforation registering with each plunger; a spring pressed operating member registering with each perforation through which it is adapted to be inserted to coact with an actuating plunger; movable members on said plate each adapted to be moved by an operating member in one row to prevent subsequent movement of a companion operating member in the other row; a movable spring pressed pin for each row adapted to be moved into position to move either of said operating members in said row into locked position; and a block movable in guides and carrying said pin adapted to return said pin to its normal position by gravity.

14. In a voting machine, the combination of two rows of registering devices each provided with an actuating plunger; a plate provided with a perforation registering with each plunger; a spring pressed operating member registering with each perforation through which it is adapted to be inserted to coact with an actuating plunger; movable members on said plate each adapted to be moved by an operating member in one row to prevent subsequent movement of a companion operating member in the other row; a movable pin for each row adapted to move either of said operating members in said row into locked position; and means for returning said pin to its normal position.

15. In a voting machine, the combination of two registering devices each provided with an actuating plunger; a plate provided with perforations registering with said plungers; a spring pressed operating member registering with each perforation and adapted to be inserted through the same to coact with one of said plungers; and a movable member on said plate partially covering both perforations and adapted to be moved by operation of one of said members to prevent the operation of the other operating member.

16. In a voting machine, the combination of two registering devices each provided with an actuating plunger; a plate provided with perforations registering with said plungers; a spring pressed operating member registering with each perforation and adapted to be inserted through the same to coact with one of said plungers; and a movable member on said plate having cam surfaces in the path of movement of said operating members and adapted to be moved by either of them into position to prevent the operation of the other.

17. In a voting machine, the combination of a plurality of alined registering devices each provided with an actuating plunger; a plate having perforations registering with said plunger; a spring pressed operating member adapted for insertion through each perforation to coact with a plunger; means for locking said operating member when thus inserted; and a device for regulating the number of operating members that may be actuated.

18. In a voting machine, the combination of a plurality of alined registering devices each provided with an actuating plunger; a plate having perforations registering with said plunger; a spring pressed operating member adapted for insertion through each perforation to coact with a plunger; means for locking said operating member when thus inserted; a block movable in guides parallel with said operating member; and means carried thereby to regulate the number of operating members that may be actuated.

19. In a voting machine, the combination of a plurality of alined registering devices each provided with an actuating plunger; a plate having perforations registering with said plunger; a spring pressed operating member adapted for insertion through each perforation to coact with a plunger; a block movable in guides parallel with said operating member; and adjustable means carried thereby to regulate the number of operating members that may be actuated.

20. In a voting machine, the combination of a plurality of registering devices each provided with an actuating plunger; a plate having perforations registering with said plunger; a spring pressed operating member adapted for insertion through each perforation to coact with a plunger; means for locking said operating member when thus inserted; a block movable in guides parallel with said operating member; a plate secured to said block; a spring pressed pin carried by said block and adapted to be moved to actuate an operating member; a pawl carried by said pin; and means on said plate coacting with said pawl for regulating the number of actuating movements of said pin.

21. In a voting machine, the combination of a plurality of alined registering devices each provided with an actuating plunger; a plate having perforations registering with said plunger; a spring pressed operating member adapted for insertion through each perforation to coact with a plunger; means for locking said operating member when thus inserted; a block movable in guides parallel with said operating member; a plate secured to said block; a spring pressed pin carried by said block and adapted to be moved to actuate an operating member; a pawl carried by said pin; means on said plate coacting with said pawl for regulating the number of actuating movements of said pin; and means for returning said regulating means to its normal position.

22. In a voting machine, the combination of a plurality of alined registering devices each provided with an actuating plunger; a plate having perforations registering with said plunger; a spring pressed operating member adapted for insertion through each perforation to coact with a plunger; means for locking said operating member when thus inserted; a block movable in guides parallel with said operating members; a plate secured to said block; a spring pressed pin carried by said block and adapted to be moved to actuate an operating member; a pawl carried by said pin; a ratchet wheel on said plate coacting with said pawl; a pinion revoluble therewith; a gear meshing therewith; a pin carried thereby; a stop to limit the movement of said pin in one direction; and means for limiting the movement of said pin in the opposite direction.

23. In a voting machine, the combination of a plurality of alined registering devices each provided with an actuating plunger; a plate having perforations registering with said plunger; a spring pressed operating member adapted for insertion through each perforation to coact with a plunger; means for locking said operating member when thus inserted; a block movable in guides parallel with said operating member; a plate secured to said block; a spring pressed pin carried by said block and adapted to be moved to actuate an operating member; a pawl carried by said pin; a ratchet wheel on said plate coacting with said pawl; a pinion revoluble therewith; a gear meshing therewith; a pin carried thereby; a stop to limit the movement of said pin in one direction; and adjustable means for limiting the movement of said pin in the opposite direction.

24. In a voting machine, the combination of a plurality of alined registering devices each provided with an actuating plunger; a plate having perforations registering with said plunger; a spring pressed operating member adapted for insertion through each perforation to coact with a plunger; means for locking said operating member when thus inserted; a block movable in guides parallel with said operating member; a plate secured to said block; a spring pressed pin carried by said block and adapted to be moved to actuate an operating member; a pawl carried by said pin; a ratchet wheel on said plate coacting with said pawl; a pinion revoluble therewith; a spring controlled gear meshing therewith; a pin carried thereby; a stop to limit the movement of said pin in one direction; means for limiting the movement of said pin in the opposite direction; a check pawl engaging said ratchet wheel and normally preventing reverse movement thereof; and means for releasing said pawl.

25. In a voting machine, the combination of a plurality of alined registering devices each provided with an actuating plunger; a plate having perforations registering with said plunger; a spring pressed operating member adapted for insertion through each perforation to coact with a plunger; means for locking said operating member when thus inserted; a block movable in guides parallel with said operating member; a plate secured to said block; a spring pressed pin carried by said block and adapted to be moved to actuate an operating member; a pawl carried by said pin; a ratchet wheel on said plate coacting with said pawl; a pinion revoluble therewith; a spring controlled gear meshing therewith; a pin carried thereby; a stop to limit the movement of said pin in one direction; means for limiting the movement of said pin in the opposite direction; a check pawl engaging said ratchet wheel and normally preventing reverse movement thereof; a spring pressed rod pivoted to said check pawl; and a movable member coacting therewith adapted to release said pawl and permit the return of said ratchet to its normal position.

26. In a voting machine, the combination of a plurality of alined registering devices each provided with an actuating plunger; a plate having perforations registering with said plunger; a spring pressed operating member adapted for insertion through each perforation to coact with a plunger; means for locking said operating member when thus inserted; a block movable in guides parallel with said operating member; a plate secured to said block; a spring pressed pin carried by said block and adapted to be moved to actuate an operating member; a pawl carried by said pin; a ratchet wheel on said plate coacting with said pawl; a pinion revoluble therewith; a spring controlled gear meshing therewith; a pin carried thereby; a stop to limit the movement of said pin in one direction; means for limiting the movement of said pin in the opposite direction; a check pawl engaging said ratchet wheel and normally preventing reverse movement thereof; a spring pressed rod pivoted to said check pawl; and a movable member coacting therewith adapted to release said pawl and permit the return of said ratchet to its normal position; and a member actuated by the voter upon exit for operating said movable member.

27. In a voting machine, the combination of a plurality of registering devices each provided with an actuating plunger; a spring pressed member for operating said plungers adapted to be moved vertically in guides and normally out of register with said plungers; a movable member provided with L-shaped slots through which said members extend and by which they are prevented from movement into position to register with either of said plungers; and means for moving said slotted member upon the entrance of a voter to release said operating members.

28. In a voting machine, the combination of a plurality of registering devices each provided with an actuating plunger; a spring pressed member for operating said plungers adapted to be moved vertically in guides and normally out of register with said plungers; a movable member provided with L-shaped slots through which said members extend and by which they are prevented from movement into position to register with either of said plungers; a rod parallel to said slotted member and movable therewith provided with a notch at each end; an entrance gate; means operated by the movement of said entrance gate coacting with one notch to move said rod so that the operating member will be released; an exit gate; and means operated thereby coacting with the other notch to return said slotted bar to its normal position.

29. In a voting machine, the combination of a plurality of registering devices each provided with an actuating plunger; a spring pressed member for operating said plungers adapted to be moved vertically in guides and normally out of register with said plungers; a movable member provided with L-shaped slots through which said members extend and by which they are prevented from movement into position to register with either of said plungers; a rod parallel to said slotted member and movable therewith provided with a notch at each end; an entrance gate; a yielding member operated by the movement of said entrance gate coacting with one notch to move said rod so that the operating member will be released; an exit gate; and a yielding member operated thereby coacting with the other notch to return said slotted bar to its normal position.

30. In a voting machine, the combination of a plurality of registering devices each provided with an actuating plunger; a spring pressed member for operating said plungers adapted to be moved vertically in guides and normally out of register with said plungers; a movable member provided with L-shaped slots through which said members extend and by which they are prevented from movement into position to register with either of said plungers; a rod parallel to said slotted member and movable therewith provided with a notch at each end; an entrance gate; a spring controlled member normally engaging one of said notches pivoted to the pivot of said gate and controlled by the movement thereof to move said rod so that the operating member will be released; an exit gate; and a member adapted to engage the other notch controlled by the operation of the exit gate to the pivot of which it is connected by a pawl and ratchet mechanism whereby said rod is returned to its normal position whenever said exit gate is operated.

31. In a voting machine, the combination of a movable member; a plurality of registering members mounted thereon and movable therewith each provided with an actuating plunger; a plurality of operating members adapted to be moved into the path of movement of said plungers; means for locking said operating members from end movement when in adjusted position; and means for moving said movable member to bring said plungers into contact with such operating members that have been moved into the path of said plungers thereby actuating said registering devices.

32. In a voting machine, the combination with a plurality of registering devices having actuating plungers in alinement; a plate having a slot registering with said actuating plungers; a member freely movable in said slot; means for locking said member opposite either of said plungers; a plate to which said registering devices are secured; and means for moving said plate so that one of said registering devices will be actuated by the contact of its plungers with said locked member.

33. In a voting machine, the combination with a plurality of registering devices having actuating plungers in alinement; a plate having a slot registering with said actuating plungers; a member freely movable in said slot; means for locking said member opposite either of said plungers; means for locking said operating member in adjusted position; and means for forcing the plunger of one of said registering devices against the end of said locked member.

34. In a voting machine, the combination with a plurality of registering devices having actuating plungers in alinement; a plate having a slot registering with said actuating plungers; a member freely movable in said slot; means for locking said member opposite either of said plungers; and means for simultaneously moving all of said registering devices so that one of the plungers thereof will be actuated by contact with said locked member and subsequently release said member from said locking means.

35. In a voting machine, the combination with a plurality of registering devices having actuating plungers in alinement; a block movable parallel therewith; an operating member having a notch in its inner end carried by said block in which it is movable to register with and actuate either of said plungers; a slotted member adapted to engage said notch and prevent said operating member from end movement under normal pressure; and means for moving said registering device so that its plunger will be forced against the end of said locked member.

36. In a voting machine, the combination with a plurality of registering devices having actuating plungers in alinement; a plate having a slot registering with said actuating plungers and a plurality of name plates thereon parallel with said slot and an aperture for each name plate also parallel to said slot; a device freely movable in said slot adapted for inward movement to operate either of said plungers and provided with an index finger adapted to coact with either name plate; a cam member on said movable device; and an indicator adapted to be moved by the inward movement of said cam member.

37. In a voting machine, the combination of two registering devices each provided with an actuating plunger; a plate provided with perforations registering with said plungers; a spring pressed operating member registering with each perforation and adapted to be inserted through the same to coact with one of said plungers; a movable member on said plate adapted to be moved by operation of one of said members to prevent the operation of the other operating member; a movable plate supporting said registering devices; and means for moving said plate so that the plunger of one of said registering devices will be operated by the inserted operating member.

38. In a voting machine, the combination of two registering devices each provided with an actuating plunger; a plate provided with perforations registering with said plungers; a spring pressed operating member registering with each perforation and adapted to be inserted through the same to coact with one of said plungers; a movable member on said plate adapted to be moved by operation of one of said members to prevent the operation of the other operating member and lock the said operating members when inserted; means for locking said operating member when inserted in a perforation; and mechanism for releasing said locking means.

39. In a voting machine, the combination of two registering devices each provided with an actuating plunger; a plate provided with a perforation registering with each plunger; a spring pressed operating member registering with each perforation through which it is adapted to be inserted to coact with an actuating plunger; a movable member on said plate adapted to be moved by one operating member to prevent subsequent movement of the other operating member and lock said operating member when inserted; a movable spring pressed pin for each operating member adapted to move it into locked position; and a cam member adapted to be moved by the voter to release said locking means.

40. In a voting machine, the combination of two registering devices each provided with an actuating plunger; a plate provided with a perforation registering with each plunger; a spring pressed operating member registering with each perforation through which it is adapted to be inserted to coact with an actuating plunger; a movable member on said plate adapted to be moved by one operating member to prevent subsequent movement of the other operating member; a movable spring pressed pin for each operating member adapted to move it into locked position; a name plate with an opening therethrough for each operating member; a block movable in guides and carrying said pin adapted to return said pin to its normal position by gravity; and an indicator for each operating member adapted to be actuated by the movement thereof to register with an opening in one of said name plates.

41. In a voting machine, the combination of two registering devices each provided with an actuating plunger; a plate provided with perforations registering with said plungers; a spring pressed operating member registering with each perforation and adapted to be inserted through the same to coact with one of said plungers; a movable member on said plate partially covering both perforations and adapted to be moved by operation of one of said members to prevent the operation of the other operating member; a name plate for each operating member provided with an opening therethrough; and an indicator for each operating member adapted to be moved opposite the opening in one of said name plates by the inward movement of said operating member.

42. In a voting machine, the combination of two registering devices each provided with an actuating plunger; a plate provided with perforations registering with said plungers; a spring pressed operating member registering with each perforation and adapted to be inserted through the same to coact with one of said plungers; a movable member on said plate having cam surfaces in the path of movement of said operating members and adapted to be moved by either of them into position to prevent the operation of the other; a name plate for each operating member provided with an opening therethrough; a pivoted indicator adapted in its movement about its pivot to register with an opening in one of said name plates; and a connector between each indicator and an operating member.

43. In a voting machine, the combination of a movable member; a plurality of registering members mounted thereon and movable therewith each provided with an actuating plunger; springs for retaining said movable member in normal position; a plurality of operating members adapted to be moved into the path of movement of said plungers; oscillating shafts; and arms secured thereto and bearing on and adapted to move said movable member to bring said plungers into contact with such operating members that have been moved into the path of said plungers thereby actuating said registering devices.

44. In a voting machine, the combination of a movable member; a plurality of registering members mounted thereon each provided with an actuating plunger; a plurality of operating members adapted to be moved into the path of movement of said plungers; means for locking said operating members in adjusted position; a pair of oscillating shafts; and arms on said shafts for moving said movable member to bring said plungers into contact with such operating members that have been moved into the path of said plungers thereby actuating said registering devices.

45. In a voting machine, the combination of a movable member; a plurality of registering members mounted thereon each provided with an actuating plunger; a plurality of operating members adapted to be moved into the path of movement of said plungers; means for locking said operating members in adjusted position; an exit gate; oscillating shafts operable by the movement of said exit gate; and roller carrying members secured to said oscillating shafts and operable thereby for moving said movable member to bring certain of said plungers into contact with the locked operating members to cause the operation of certain of said registering devices.

46. In a voting machine, the combination with a plurality of registering devices provided with actuating plungers in two parallel lines; a movable plate provided with two parallel rows of perforations having beveled edges, said rows being a different distance apart than said lines of plungers; an operating member for each line of plungers normally beyond the limits of said flanges but each adapted to be moved into position to operate one of said plungers and when inserted in said perforation thereby prevent the admission of the other operating member into one of the perforations in the other row.

47. In a voting machine, the combination of a plurality of registering devices, each provided with an actuating plunger; a plate having a perforation therein; a chute to receive a ballot; a spring pressed operating member adapted to be moved into position to be inserted in said perforation; means for locking said operating member when inserted in said perforation; and means for releasing said operating member and at the same time permit the movement of said ballot through said chute.

48. In a voting machine, the combination of a plurality of registering devices, each provided with an actuating plunger; a plate having a perforation therein; a chute to receive a ballot; a spring pressed operating member adapted to be moved into position to be inserted in said perforation; means for locking said operating member when inserted in said perforation; means for releasing said operating member; and mechanism actuated by said releasing means for actuating said ballot through said chute.

49. In a voting machine, the combination of a plurality of registering devices, each provided with an actuating plunger; a plate having a perforation therein; a chute to receive a ballot; a spring pressed operating member adapted to be moved into position to be inserted in said perforation; means for locking said operating member when inserted in said perforation; means for releasing said operating member; and a serrated device actuated by said releasing means for actuating said ballot through said chute.

50. In a voting machine, the combination of a plurality of registering devices, each provided with an actuating plunger; a plate having a perforation therein; a chute to receive a ballot; a spring pressed operating member adapted to be moved into position to be inserted in said perforation; means for locking said operating member when inserted in said perforation; means for releasing said operating member; and a slotted arm secured to said releasing means and movable therewith, said slot being normally out of alinement with the end of said chute and in alinement therewith upon the completion of the movement of said releasing means.

51. In a voting machine, the combination of a plurality of registering devices, each provided with an actuating plunger; a plate having a perforation therein; a chute to receive a ballot; a spring pressed operating member adapted to be moved into position to be inserted in said perforation; means for locking said operating member when inserted in said perforation; means for releasing said operating member; a pivoted member adapted to be moved into position over said operating member to prevent its further upward movement; and means connected to said pivoted member extending into said chute and adapted to be actuated by the insertion of a ballot.

52. In a voting machine, the combination of a plurality of registering devices, each provided with an actuating plunger; a plate having a perforation therein; a chute to receive a ballot; a spring pressed operating member adapted to be moved into position to be inserted in said perforation; means for locking said operating member when inserted in said perforation; means for releasing said operating member; a stop member extending into said chute; and means connected thereto actuated by the insertion of said operating member into its perforation to remove it from the path of a ballot being inserted in said chute.

53. In a voting machine, the combination of a plurality of registering devices, each provided with an actuating plunger; a plate having a perforation therein; a chute to receive a ballot; a spring pressed operating member adapted to be moved into position to be inserted in said perforation; means for locking said operating member when inserted in said perforation; means for releasing said operating member; a slotted plate secured to said releasing means and movable therewith, said slot being normally out of alinement with the end of said chute and in alinement therewith upon the completion of the movement of said releasing means; a pivoted member adapted to be moved into position over said operating member to prevent its further upward movement; and means connected to said pivoted member extending into said chute and adapted to be actuated by the insertion of a ballot.

54. In a voting machine, the combination of a plurality of registering devices, each provided with an actuating plunger; a plate having a perforation therein; a chute to receive a ballot; a spring pressed operating member adapted to be moved into position to be inserted in said perforation; means for locking said operating member when inserted in said perforation; means for releasing said operating member; a slotted plate secured to said releasing means and movable therewith, said slot being normally out of alinement with the end of said chute and in alinement therewith upon the completion of the movement of said releasing means; a stop member extending into said chute; and means connected thereto actuated by the insertion of said operating member into its perforation to remove it from the path of a ballot being inserted in said chute.

55. In a voting machine, the combination of a plurality of registering devices, each provided with an actuating plunger; a plate having a perforation therein; a chute to receive a ballot; a spring pressed operating member adapted to be moved into position to be inserted in said perforation; means for locking said operating member when inserted in said perforation; means for releasing said operating member; a pivoted member adapted to be moved into position over said operating member to prevent its further upward movement; means connected to said pivoted member extending into said chute and adapted to be actuated by the insertion of a ballot; a stop member extending into said chute; and means connected thereto actuated by the insertion of said operating member into its perforation to remove it from the path of a ballot being inserted in said chute.

56. In a voting machine, the combination of a plurality of registering devices, each provided with an actuating plunger; a plate having a perforation therein; a chute to receive a ballot; a spring pressed operating member adapted to be moved into position to be inserted in said perforation; means for locking said operating member when inserted in said perforation; means for releasing said operating member; a slotted plate secured to said releasing means and movable therewith, said slot being normally out of alinement with the end of said chute and in alinement therewith upon the completion of the movement of said releasing means; a pivoted member adapted to be moved into position over said operating member to prevent its further upward movement; means connected to said pivoted member extending into said chute and adapted to be actuated by the insertion of a ballot; a stop member extending into said chute; and means connected thereto actuated by the insertion of said operating member into its perforation to remove it from the path of a ballot being inserted in said chute.

57. In a voting machine, the combination of a plurality of registering devices each provided with an actuating plunger; a plate having a plurality of perforations therein; a spring controlled operating member for each perforation normally removed therefrom but in alinement therewith; an opening in a name strip; a pivoted indicator adapted to be moved opposite said opening; means interposed between said spring controlled operating member and said indicator whereby the movement of said operating member causes said indicator to register with said opening; a spring controlled pin movable into position to actuate said operating member; and a device to lock said operating member when inserted through a perforation in said plate.

58. In a voting machine, the combination of a plurality of registering devices each provided with an actuating plunger; a plate having a plurality of perforations therein; a spring controlled operating member for each perforation normally removed therefrom but in alinement therewith; an opening in a name strip; a pivoted indicator adapted to be moved opposite said opening; means interposed between said spring controlled operating member and said indicator whereby the movement of said operating member causes said indicator to register with said opening; a spring controlled pin movable into position to actuate said operating member; a device to lock said operating member when inserted through a perforation in said plate; and means operable by the voter for releasing said operating member.

Signed by me at 4 P. O. Sq., Boston, Mass., this 4th day of April, 1912.

GUY C. CLAYPOOLE.

Witnesses:
WALTER E. LOMBARD,
NATHAN C. LOMBARD.

Copies of this patent may be obtained for five cents each, by addressing the "Commissioner of Patents, Washington, D. C."